(12) United States Patent
Rohaly, Jr.

(10) Patent No.: US 11,932,205 B1
(45) Date of Patent: Mar. 19, 2024

(54) DELIVERY APPARATUS FOR PASSENGER SEAT

(71) Applicant: George P. Rohaly, Jr., Willard, OH (US)

(72) Inventor: George P. Rohaly, Jr., Willard, OH (US)

(73) Assignee: Chicago Junction Ventures, LLC, Willard, OH (US)

( * ) Notice: Subject to any disclaimer, the term of this patent is extended or adjusted under 35 U.S.C. 154(b) by 0 days.

(21) Appl. No.: 18/356,228

(22) Filed: Jul. 21, 2023

(51) Int. Cl.
*B60N 3/00* (2006.01)
*B60R 7/04* (2006.01)
*B60R 11/00* (2006.01)

(52) U.S. Cl.
CPC .............. *B60R 7/043* (2013.01); *B60N 3/002* (2013.01); *B60R 2011/0012* (2013.01); *B60R 2011/0085* (2013.01)

(58) Field of Classification Search
CPC ................................. B60N 3/002; B60R 7/043
USPC ......................................................... 224/275
See application file for complete search history.

(56) References Cited

U.S. PATENT DOCUMENTS

| | | | | |
|---|---|---|---|---|
| 1,727,011 A * | 9/1929 | Heileman | ................ | B41J 13/26 462/74 |
| 2,640,595 A * | 6/1953 | Byford | .................... | B60R 7/043 211/74 |
| 2,767,895 A * | 10/1956 | Smith | ..................... | B60R 7/043 224/563 |
| 2,875,940 A * | 3/1959 | Dunn | ..................... | B65D 61/00 206/562 |
| 3,063,064 A * | 11/1962 | Mace | .................... | B60N 2/2854 108/166 |
| 3,318,456 A * | 5/1967 | Lipe | ....................... | B60N 3/002 297/188.2 |
| 3,326,445 A * | 6/1967 | Goings | .................. | A47B 31/06 211/74 |
| 3,338,629 A * | 8/1967 | Drees | ..................... | B60R 7/043 312/235.8 |
| 3,379,316 A * | 4/1968 | Harrell | ................... | B60N 3/103 211/132.1 |
| 3,434,650 A * | 3/1969 | Goings | .................. | B65D 71/72 206/563 |
| 3,499,595 A * | 3/1970 | Brooks | ................ | B65D 5/5206 211/73 |
| 3,828,994 A * | 8/1974 | Hollins | .................. | B60N 2/809 224/544 |
| 3,934,771 A * | 1/1976 | Eberhard | ................ | B60R 11/04 224/929 |
| 4,313,589 A * | 2/1982 | Vega | ...................... | A47B 23/04 248/460 |

(Continued)

*Primary Examiner* — Scott T McNurlen
*Assistant Examiner* — Lester L Vanterpool
(74) *Attorney, Agent, or Firm* — Kathryn Perales

(57) ABSTRACT

The Delivery Butler is an apparatus that creates a level surface in a vehicle's passenger seat, for the purpose of transporting items like pizza, take-out food containers, cakes and flower arrangements. The apparatus has adjustable legs and a hinged connection between its base panel and rear panel, which allows the receiving surface to be adjusted to level. The apparatus is belted into a seat, and can include a non-slip receiving surface and a fence structure on the receiving surface. The apparatus does not require any modifications to a passenger seat, and can be dismantled by hand and stored virtually flat.

8 Claims, 8 Drawing Sheets

(56) References Cited

U.S. PATENT DOCUMENTS

| | | | | |
|---|---|---|---|---|
| 4,787,541 A | * | 11/1988 | Pollard | A47B 31/06 |
| | | | | 224/556 |
| 4,801,060 A | * | 1/1989 | Thompson | B60N 3/103 |
| | | | | 224/544 |
| 4,938,401 A | * | 7/1990 | Weisbrodt | B60R 7/043 |
| | | | | 224/544 |
| 5,102,080 A | * | 4/1992 | Altieri, Jr. | B60N 3/103 |
| | | | | 248/174 |
| 5,253,791 A | * | 10/1993 | Chiodo | B60R 7/043 |
| | | | | 296/37.15 |
| D341,249 S | * | 11/1993 | Scheurer | D12/420 |
| D360,183 S | * | 7/1995 | Girandola | D12/425 |
| 5,470,002 A | * | 11/1995 | DiStefano | B60R 7/043 |
| | | | | 206/522 |
| 5,611,287 A | * | 3/1997 | Begley | B60R 7/043 |
| | | | | 108/44 |
| 5,628,439 A | * | 5/1997 | O'Hara | B60R 7/043 |
| | | | | 224/563 |
| 5,660,117 A | * | 8/1997 | Noble | A47B 23/043 |
| | | | | 248/460 |
| 5,687,893 A | * | 11/1997 | Jacobsmeyer, Jr. | B60R 7/043 |
| | | | | 211/195 |
| 5,785,003 A | * | 7/1998 | Jacobson | A01K 1/0272 |
| | | | | 119/28.5 |
| 5,913,782 A | * | 6/1999 | Monaco | E04G 3/26 |
| | | | | 52/126.1 |
| 5,918,550 A | * | 7/1999 | Weir | A47B 13/16 |
| | | | | 108/157.11 |
| 5,996,507 A | * | 12/1999 | Joseph | B60N 3/001 |
| | | | | 248/188.5 |
| 6,439,133 B1 | * | 8/2002 | Jaramillo | A47B 21/0314 |
| | | | | 108/44 |
| D473,840 S | * | 4/2003 | Sauer | D12/416 |
| 6,554,691 B1 | * | 4/2003 | Schauls | A22C 25/06 |
| | | | | 452/194 |
| 7,481,169 B2 | * | 1/2009 | Larson | B60N 3/002 |
| | | | | 248/346.05 |
| 7,931,188 B2 | * | 4/2011 | Marinelli | B65D 5/52 |
| | | | | 248/152 |
| 8,662,501 B1 | * | 3/2014 | Perales | A63B 67/066 |
| | | | | 273/400 |
| 9,610,900 B1 | * | 4/2017 | Bello | B60N 3/103 |
| 10,202,060 B2 | * | 2/2019 | Huebner | B60N 2/90 |
| 10,612,304 B2 | * | 4/2020 | Fischer | E04G 1/30 |
| 11,161,459 B1 | * | 11/2021 | Tucker | B60R 7/043 |
| 2002/0162935 A1 | | 11/2002 | Hardy | F16M 11/38 |
| | | | | 248/459 |
| 2006/0076379 A1 | * | 4/2006 | Hussaini | F25D 31/005 |
| | | | | 224/511 |
| 2006/0243782 A1 | * | 11/2006 | DeWolfe | B65D 5/5273 |
| | | | | 229/104 |
| 2007/0152000 A1 | * | 7/2007 | Franzi | B60R 11/0235 |
| | | | | 224/572 |
| 2008/0067205 A1 | * | 3/2008 | Semendoff | B60R 7/043 |
| | | | | 224/275 |
| 2008/0223913 A1 | * | 9/2008 | Nadeau | B60R 11/00 |
| | | | | 229/152 |
| 2011/0215121 A1 | * | 9/2011 | Hutchison | B60N 3/10 |
| | | | | 224/275 |
| 2011/0278334 A1 | * | 11/2011 | Aadahl | B60R 7/043 |
| | | | | 224/275 |
| 2015/0230424 A1 | * | 8/2015 | Hartelius | B60R 22/10 |
| | | | | 248/505 |
| 2015/0232042 A1 | * | 8/2015 | Baker | B60N 3/103 |
| | | | | 224/539 |
| 2017/0008439 A1 | * | 1/2017 | DiFiore | A47J 47/145 |
| 2021/0402905 A1 | * | 12/2021 | Bruni | B60R 7/043 |

\* cited by examiner

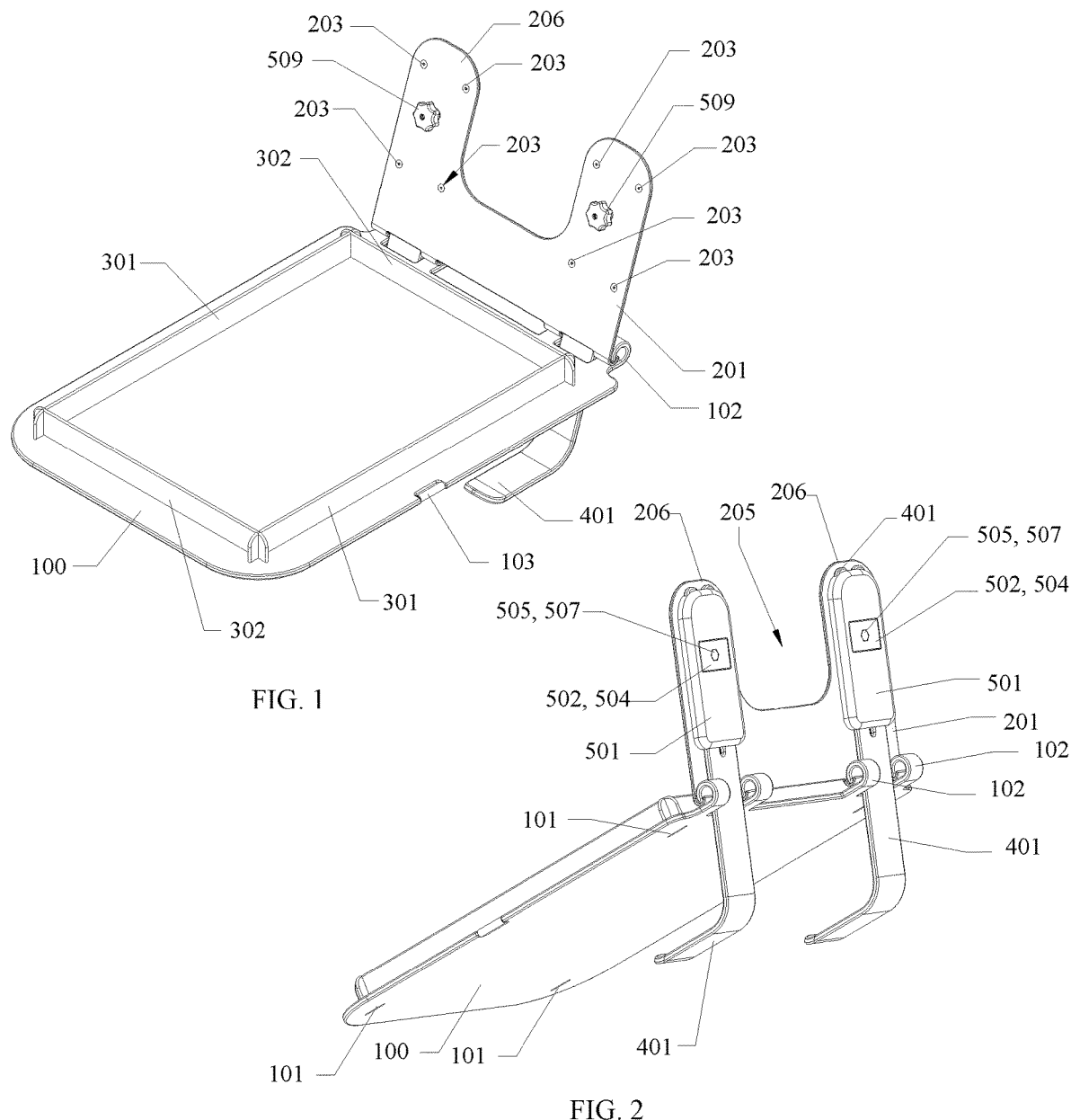

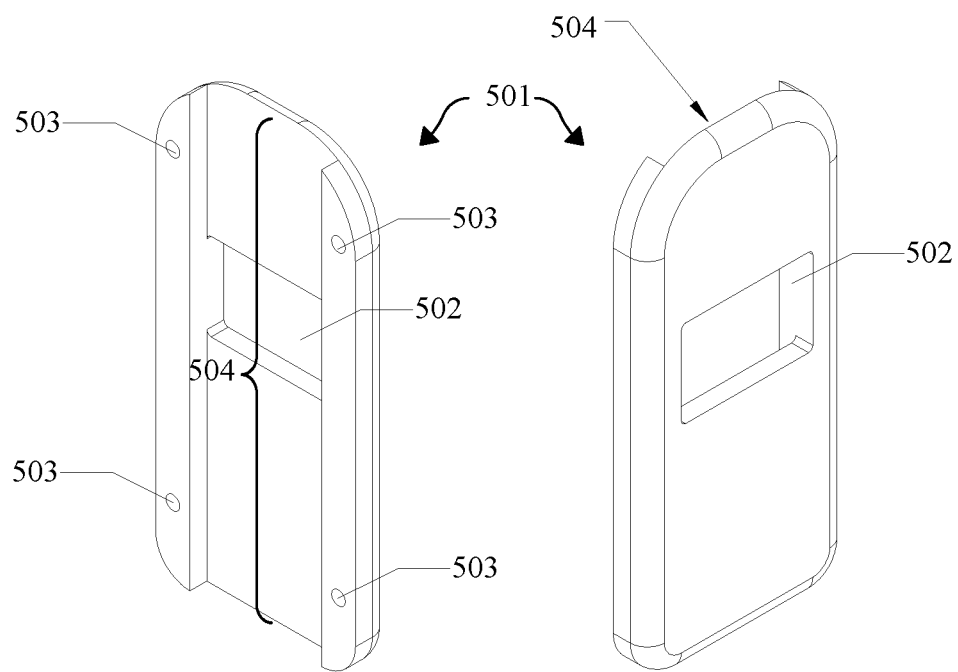
FIG. 7A
FIG. 7B
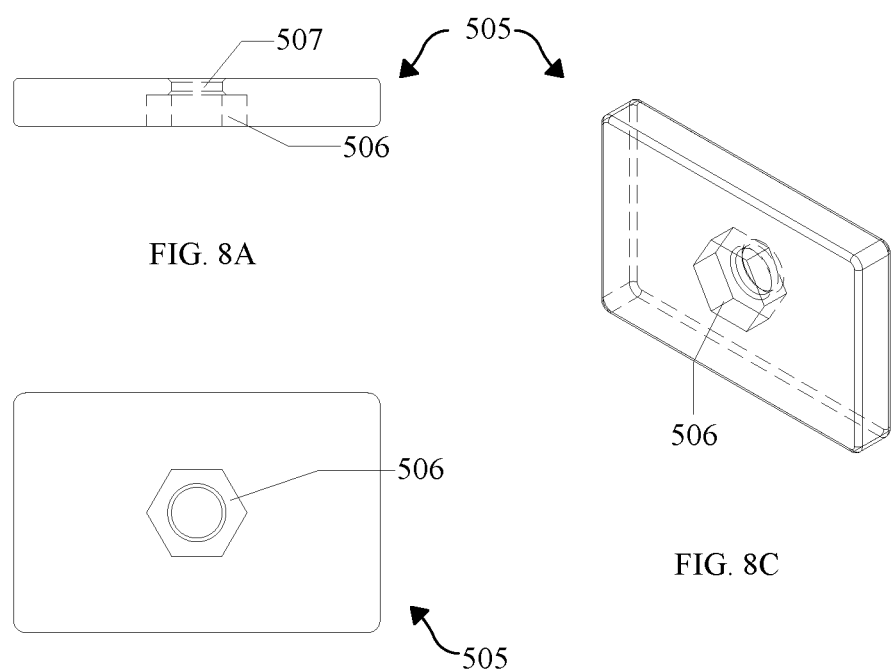
FIG. 8A
FIG. 8B
FIG. 8C

DELIVERY APPARATUS FOR PASSENGER SEAT

BACKGROUND OF THE INVENTION

The service of delivery of food and other items to consumers by drivers using personal cars and trucks has skyrocketed in the past several years. Drivers commonly place items on a passenger seat for transit, for example front seat, back seat, bench type or bucket seat. The layout and shape of the passenger seats of personal vehicles has created an issue for the drivers making these deliveries. The surface of most passenger seats is not level or flat. It is sloped, being higher in front and lower in the back, next to the backrest, and the seating surface is sometimes contoured. The angle or slope of seats in vehicles vary tremendously even between the front and rear seats in the same vehicle.

When an item is placed on a seat, it conforms or tilts to the angle of the receiving surface. This sloping, soft, non-uniform surface causes floral arrangements to spill water out of the container or tip all the way over; the slanted receiving surface causes soup and other liquid items to slosh and spill; hot pizza slumps down toward one end of its box; and layer cakes can lose their structure, the layers becoming misaligned or falling apart altogether. A level surface to accept goods is needed to avoid spillage of liquid from items like saucy foods and floral arrangements, and to avoid ruining the structure of items like pizza and cakes.

To overcome this problem, drivers have tried homemade solutions such as rolled towels and pillows. The Pizza Leveler from deliverybags.com claims to eliminate sliding cheese and toppings, but has a finite number of settings, does not conform to all angles and seat shapes, and does not secure items from moving around. Another attempt has come from stupidcartray.com, with one available non-adjustable leg, which does not address the varied angles of passenger seats in vehicles.

BRIEF SUMMARY OF THE INVENTION

The invention is an apparatus, called the Delivery Butler, which allows food and other items to be levelly transported in a seat of a car or truck without altering or adjusting the vehicle at all. The apparatus has a bottom panel which creates a level surface over the seat; a rear panel which rests against the seat back; and two angled legs which adjustably attach to the rear panel, and extend below the bottom panel to reach the seat surface.

The apparatus addresses the issue of varying angle and shape of seat surfaces. The receiving surface of the apparatus (bottom panel) can be made level without guesswork, by adjusting the two legs upwards or downwards, and checking levelness using the built-in bubble level. The legs' angle and shape fit well in different types of vehicle seats, the legs are easily adjustable, and the apparatus can be set to securely stay at a desired fixed level and angle.

The Delivery Butler addresses the issue of items sliding side to side and back to front. A non-skid foam material covers the receiving surface of the bottom panel, increasing friction between the receiving surface and the bottom surface of the transported item. A removable "fence" feature creates sides that items can fit inside, with the sides creating a boundary which prevents lateral sliding beyond the fence boundary. If ever necessary, these fences can be easily removed to accommodate items that exceed one or more fence dimensions.

The Delivery Butler addresses the issue of items tilting or toppling over. The fence feature and other inserts can stabilize items, so that they remain in place and upright.

The Delivery Butler can be easily removed, dismantled and stored, taking up minimal storage space with all pieces flat except for the angled legs and hinges. There is absolutely no need for vehicle modification for use.

BRIEF DESCRIPTION OF THE DRAWINGS

FIG. 1 is an isometric view from the top and front of the Delivery Butler assembly.

FIG. 2 is an isometric view from the bottom and back of the Delivery Butler assembly.

FIG. 7A is an isometric view from the front and side of a leg guide.

FIG. 7B is an isometric view from the back and side of a leg guide.

FIG. 8A is a top view of a leg clamp plate.

FIG. 8B is a rear view of a leg clamp plate.

FIG. 8C is an isometric view from the rear and side of a leg clamp plate.

DETAILED DESCRIPTION OF THE INVENTION

Figure 3:
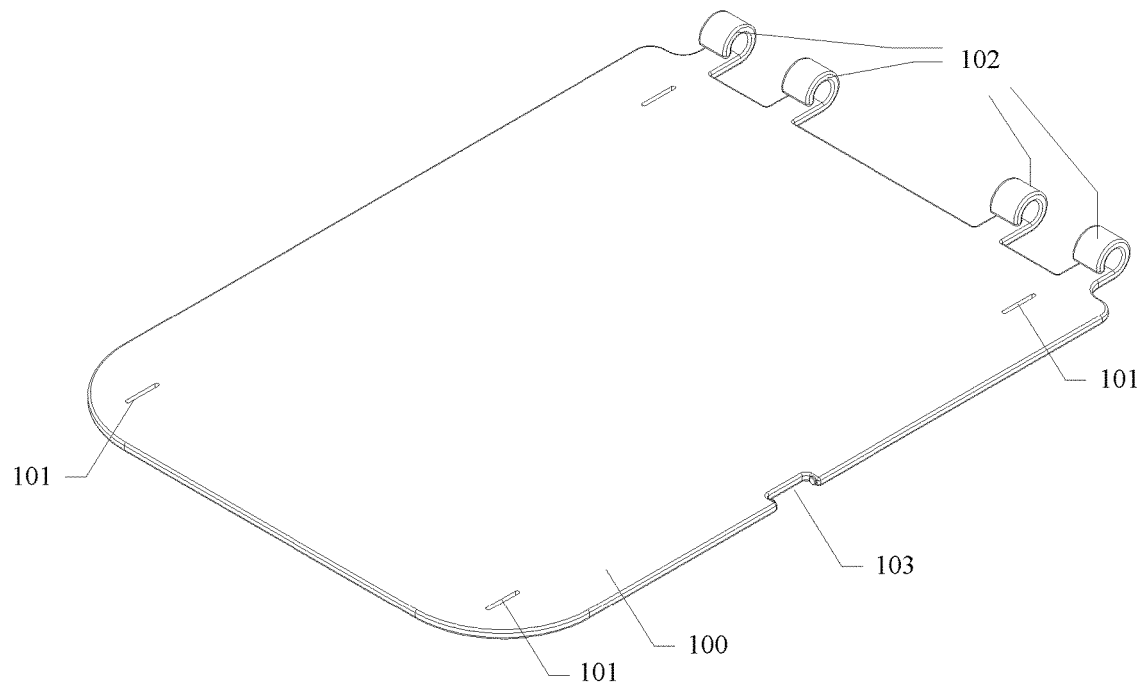
FIG. 3 is an isometric view from the top and front of the base panel.
Figures 4A, 4B:
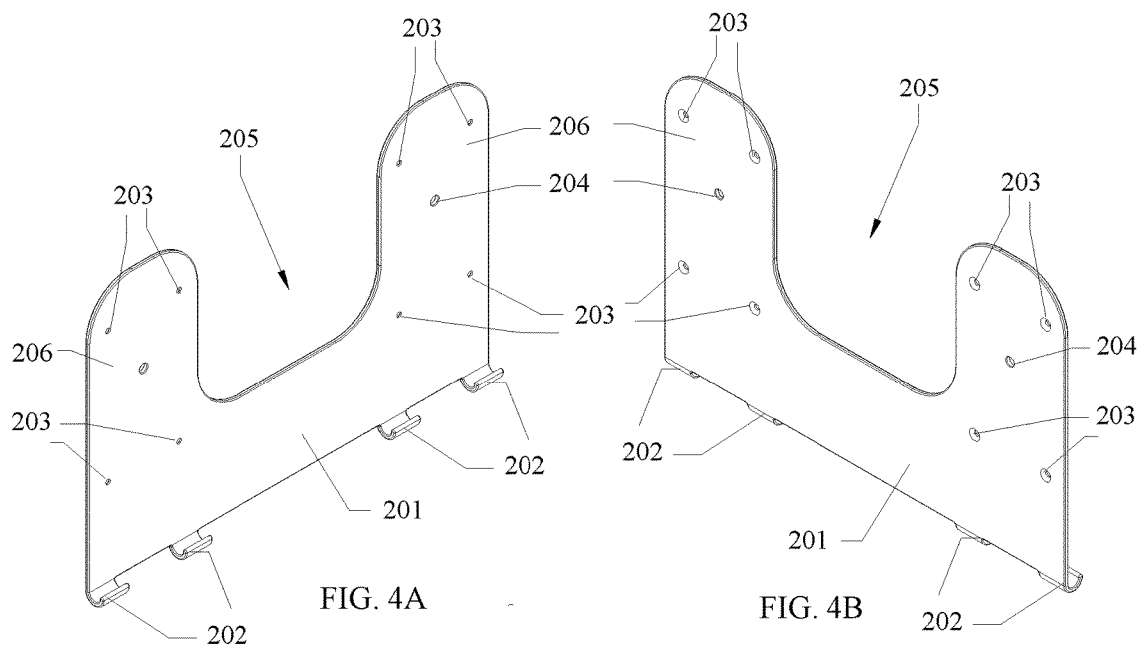
FIG. 4A is an isometric view from the rear of the rear panel.
FIG. 4B is an isometric view from the front of the rear panel.
Figure 5A:
FIG. 5A is a side view of a side fence piece of a fence assembly.
Figure 5B:
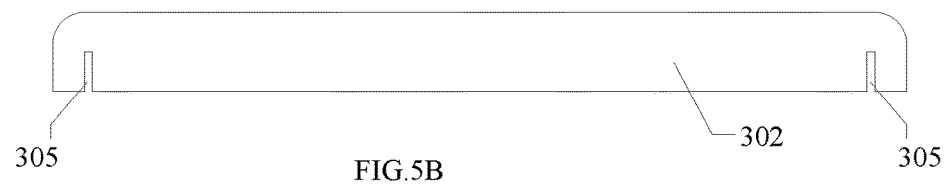
FIG. 5B is a front view of a front/rear fence piece of a fence assembly.

The invention enables level and successful transport of items in a passenger seat. The Delivery Butler provides an adjustably level receiving surface, prevents excessive lateral and front to back sliding on the receiving surface, and is easily installed, removed and stored.

The Delivery Butler is shown fully assembled in FIGS. 1 and 2. The base panel 100, shown in FIGS. 1, 2, 3, 12B, 13A, 13B, 14A and 14B is flat, except for the four curls 102 at its rear edge, which are part of the hinges where the base panel 100 attaches to the rear upright panel 201, and are shown in more detail in FIGS. 12A and 12B. These minimal pivot points offer the strength needed with low resistance to pivoting at the pivot point, making adjustment to level easy. A bubble level insert (shown in FIG. 14A at 103) is installed into a notch 103 for that purpose on the side of the base panel 100, providing a visual aid and preventing guesswork for levelness. In a preferred embodiment, the base panel is ¼ inch thick.

Four slots 101 are cut into the base panel 100, and are configured to receive the tabs 303 of two side fence rails 301, which are shown in FIGS. 1, 2, 5A, 5B and 14B. The side fence rails 301 have notches 304 which are configured to receive the notches 305 of two front/rear fence rails 302, creating a four-sided fence on the receiving surface of the base panel 100. The fence rails 301, 302 can easily be installed or removed by hand. The fence rails provide a boundary which prevents items resting on the receiving surface of the base panel, within the fence, from sliding beyond the boundary of the fence. Four was found to be the optimum number of slots, allowing the fence to be installed securely, while minimizing the number of holes in the base panel, to reduce liquid leakage through slots onto the seat, in case a spill or condensation happens when the fence is not installed.

For items which exceed the boundary size, a user can decide to use the delivery apparatus without the fence rails. As another way to minimize lateral and forward/backward slipping, a layer of nonslip/nonskid material 704 can be placed on the receiving surface of the base panel, as shown in FIG. 14B. Some examples of non-skid material that work well are urethane foam, EPDM foam, fabric with ERB dots, polypropylene, nitrile rubber, PVC fabric, and Gorilla Grip brand shelf liner.

A rear panel 201, shown in FIGS. 1, 2, 4A, 4B, 11A, 11B, 12B, 13A, 13B, 14A and 14B supports the base panel 100 with curled ends 202 that fit into the base curls 102 for a hinge. In a preferred embodiment, the rear panel is ⅛ inch thick. In a preferred embodiment, the inner radius of each rear panel curl 202 is 0.1875 inches, the outer radius of each rear panel curl 202 is 0.3125 inches, the inner radius of each base panel curl 102 is 0.3125 inches, and the outer radius of each base panel curl 102 is 0.5625 inches.

The rear panel 201 has an upper central portion 205 cut out, reducing the materials needed for manufacturing. Left and right flat upper portions 206 remain, each in position to support a leg guide 501 and tightening assembly to receive the legs 401. Each upper portion 206 has a bolt hole 204 and leg guide attachment holes 203.

Figures 9A, 9B:
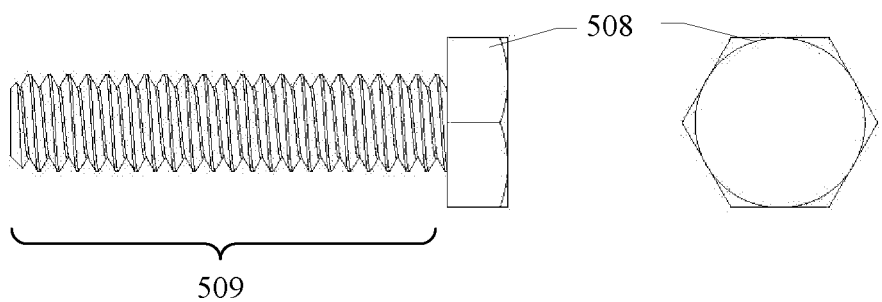
FIG. 9A is a side view of a hex bolt.
FIG. 9B is a rear view (as installed) of a hex bolt.

A leg guide 501, shown in FIGS. 7A, 7B, 11A and 11B, attaches to the rear surface of each upper portion 206 of the rear panel 201 with fasteners at leg guide fastening points 203, 503. The leg guide is shallow, comes pre-attached to the rear panel, has a vertical channel 504 configured to receive a leg 401, and holds the leg in place, preventing it from shifting or pulling away. Each leg guide 501 has a rectangular indentation 502 on its rear surface, where a free floating rectangular shaped block (leg clamp plate) 505 fits. Each leg clamp plate 505, shown in FIGS. 8A, 8B and 8C, has a hexagonal indentation 506 on its rear surface which receives the shaft 509 and head 508 of a hex bolt, shown in FIGS. 9A and 9B. A hole 507 runs horizontally through the leg clamp plate 505, matching the diameter of the hex bolt shaft 509, which passes through the hole 507 in the leg clamp plate 505 to the leg clamp plate's front surface. The front surface of the leg clamp plate 505 creates the main friction point locking the adjustable legs 401 in the tightening assembly.

Figures 10A, 10B:
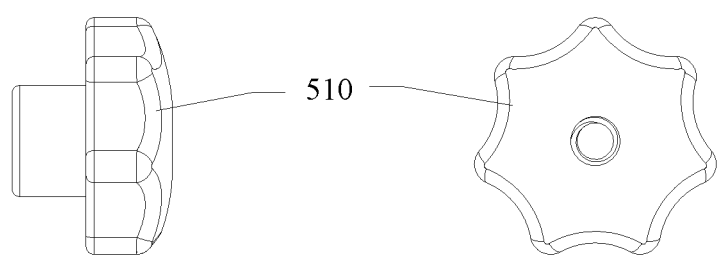
FIG. 10A is a side view of a low profile knob.
FIG. 10B is a front view (as installed) of a low profile knob.
Figure 11A:
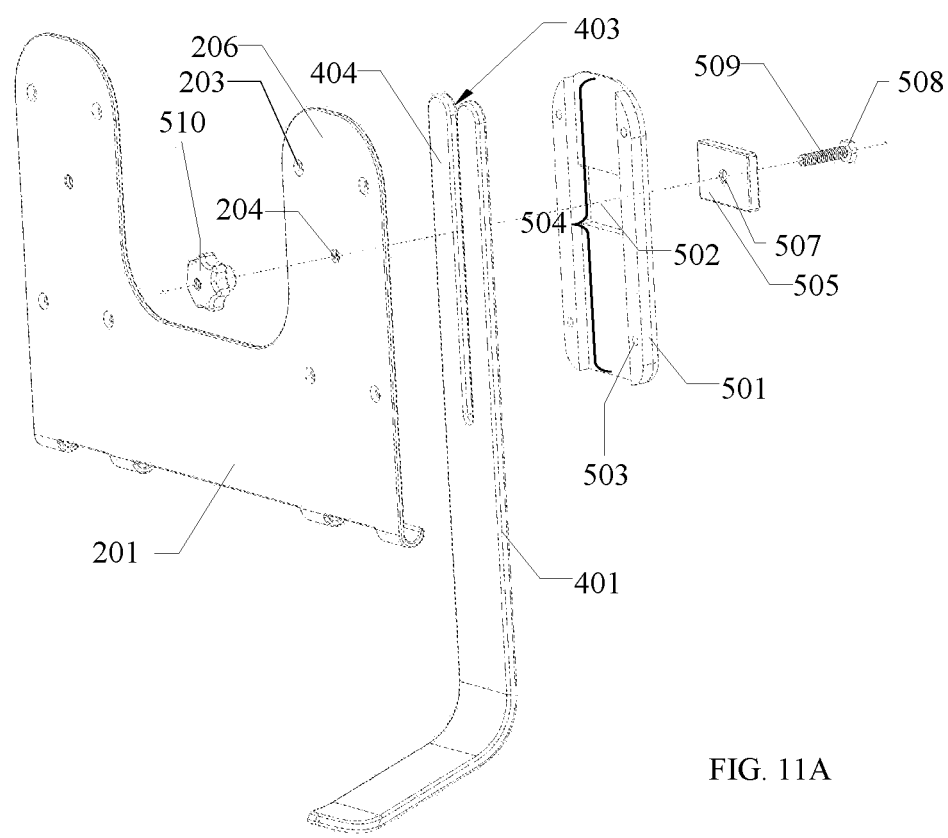
FIG. 11A is an isometric view from the front, showing an exploded view of a tightening assembly.
Figure 11B:
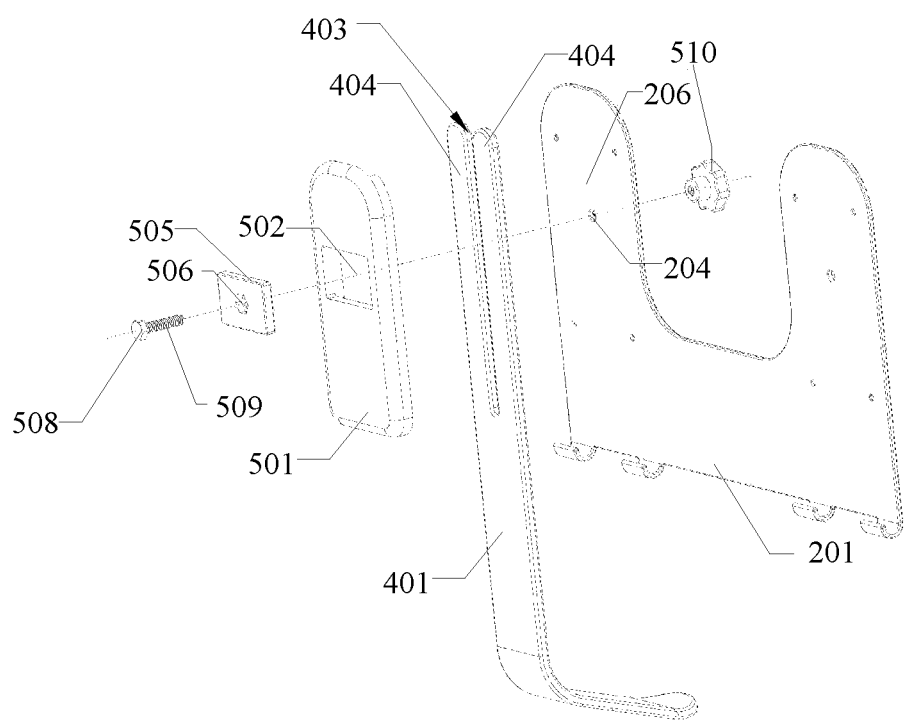
FIG. 11B is an isometric view from the rear, showing an exploded view of a tightening assembly.

When assembled, as shown in FIGS. 11A and 11B, the hex bolt head 508 is seated in the leg clamp plate's hex indentation 506 roughly flush with the rear surface of the leg clamp plate 505, and the hex bolt shaft 509 passes through the leg clamp plate hole 507, past the front surface of the leg clamp plate 505, through a channel 504 within the leg guide 501, and through a hole 204 in the rear panel 201, and receives a low profile knob 510, shown in FIGS. 10A and 10B, at the front surface of the rear panel 201. The assembly of leg guide 501, leg clamp plate 505, hex bolt 508, 509, and rear panel 201 can be tightened using the low profile knob 510 (collectively called a tightening assembly.) The combination of hex bolt head 508, leg clamp plate hex indentation 506 and leg guide indentation 502 prevents the bolt 508, 509 from turning while the low profile knob 510 is turning. The leg clamp plate 505 acts like a washer and spreads the load, protecting the legs and leg guide from eventual gouging during use, and creating a smooth rear surface for the Delivery Butler, to protect the seat back.

The bottom end of each tightening assembly receives the top end of a leg 401. The leg component 401 is shown in FIGS. 1, 2, 6A, 6B and 6C. The upper segment 402 of each leg has a slot 403 which extends from the top of the leg 401 approximately halfway down the length of its flat upper segment 402, creating two separate flat prongs 404, a left and a right prong 404. The prongs 404 of the leg component 401 slide up into a vertical channel 504 within the leg guide and tightening assembly, and the slot 403 allows the leg's upper segment 402 to travel up past and around the hex bolt shaft 509. When the knob 510 is loosened, the position of the leg can be adjusted up or down. Upon tightening of the knob 510 on the hex bolt shaft 509, friction and pressure is created to hold the leg 401 securely in place.

As shown in FIGS. 2, 6A, 6C, 11A and 11B, the slot 403 in the upper segment 402 of the leg 401 extends through the top of the leg, allowing the leg 401 to be inserted into and removed from the bottom of the leg guide 501, and to straddle the hex bolt inside the tightening assembly. This is convenient when the user wants to disassemble the whole apparatus for storage—the legs can be completely removed from the rear panel/leg guide, while leaving the hex bolt in place. The legs can alternatively be manufactured with a slot that does not extend all the way to the top edge of the leg. With this configuration, the leg could not be removed from the rear panel/leg guide unless the hex bolt is also removed.

Figures 6A, 6B, 6C:
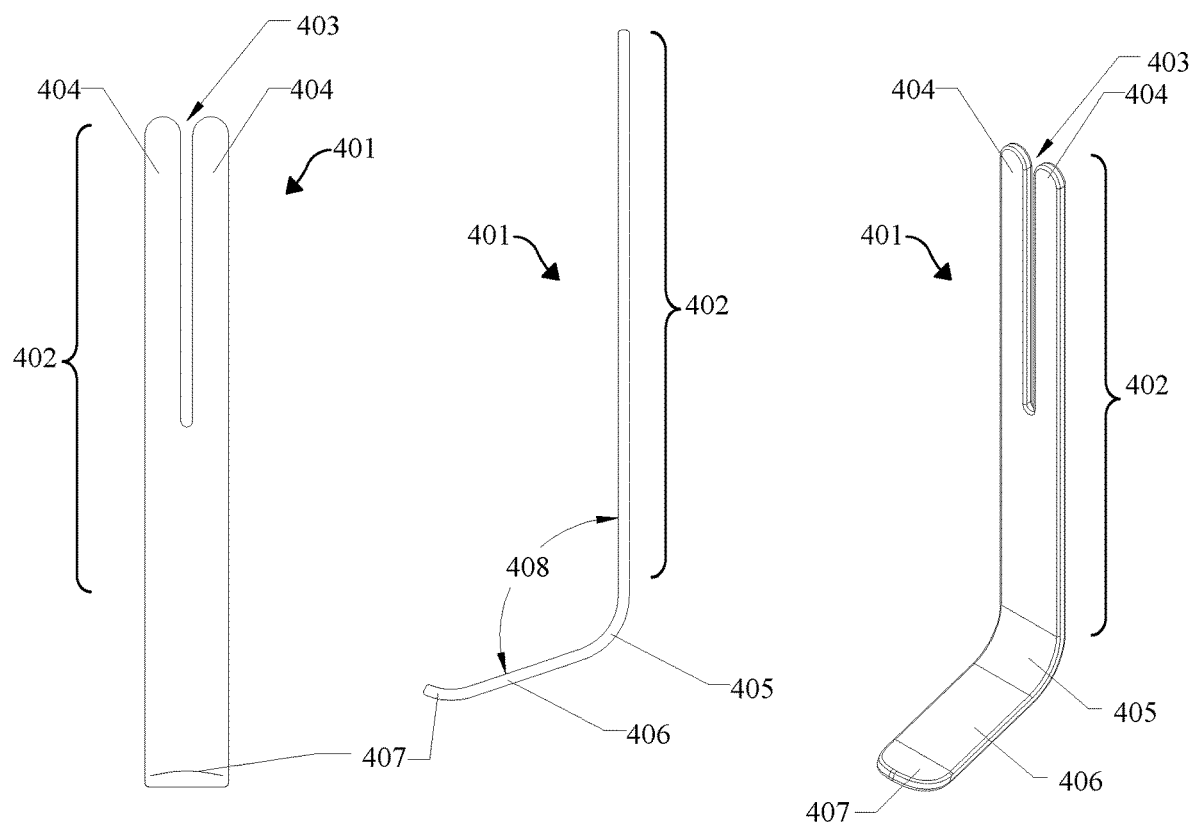
FIG. 6A is a front view of a leg.
FIG. 6B is a side view of a leg.
FIG. 6C is an isometric view from the front and side of a leg.

Each leg has a rounded bend 405 between its upper segment 402 and foot segment 406, much like a heel. When installed, the upper segment 402 is parallel to the rear panel 201, and the foot segment 406 rests on the seat 700, bending up toward the front of the seat and the front edge of the base panel 100, underneath the base panel. The bend 405 may flex slightly, depending on the material that the leg 401 is made of, and the amount of weight on the base panel 100. A range of angles formed between the upper segment 402 and foot segment 406 were tested, between 90 degrees and 115 degrees, and an angle of 108.5 degrees 408 was found to be ideal, as shown in FIG. 6B. Each leg has an upwardly turned "toe" 407, which minimizes the possibility of the foot 406 damaging the seat.

Figure 12A:
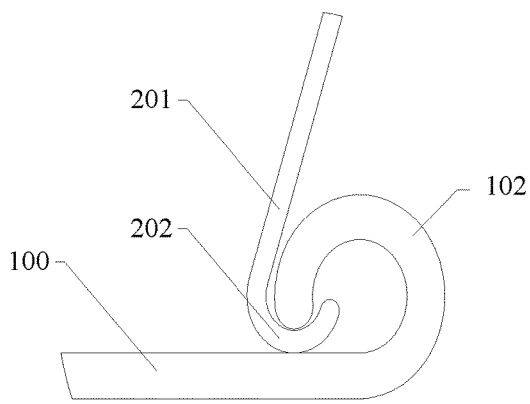
FIG. 12A is a blown up detail view of the intersection of the hinge portions of the base panel and rear panel.
Figure 12B:
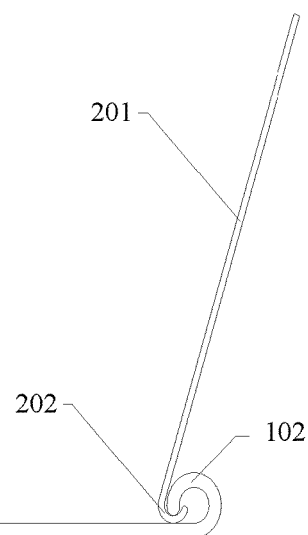
FIG. 12B is a side view of the base panel and rear panel, without legs or other components installed.
Figure 13A:
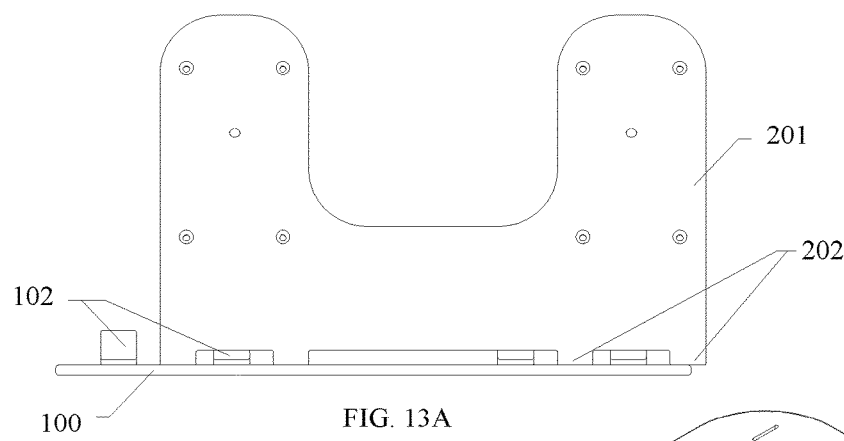
FIG. 13A is a front view of the base panel and rear panel with hinge portions aligned in position to be slid together.
Figure 13B:
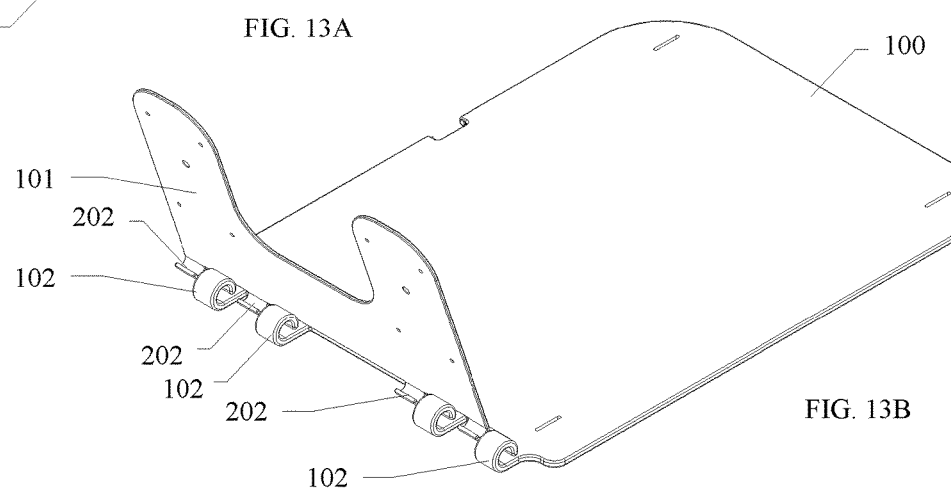
FIG. 13B is an isometric view from the top and rear of the base panel and rear panel with hinge portions aligned in position to be slid together.

The hinge area, see FIGS. 12A and 12B, allows the angle between the base panel 100 and rear panel 201 to be altered to a continuous range of angles, and therefore the levelness of the base panel 100 to be adjusted for any seating configuration. As shown in FIGS. 13A and 13B, the curls on the base panel and rear panel can be configured to slide laterally together, no tools being necessary to securely put together or take apart these components of the Delivery Butler. When at least one leg 401 is installed into the leg guide 501 and tightening assembly, as shown in FIGS. 1 and 2, the leg 401 prevents the base panel 100 and rear panel 201 from sliding apart. The hinge configuration shown in FIGS. 12A and 12B rests against the lumbar curve of many passenger seats, providing increased stability for the apparatus.

Depending upon the size of the vehicle seat, the front edge of the base panel 100 can rest on the seat 700 as shown in FIG. 14B, or the front edge of the base panel 100 can hang over the front edge of the seat 700, and the portion of the base panel 100 that rests on the seat can be a bit further back, as shown in FIG. 14B. In either case, there is a fulcrum line where the bottom surface of the base panel 100 contacts the top surface of the seat 700, and this sets the constant height of the front portion of the base panel 100. The foot segments of the legs contact an area of the seat surface which is close to the seat back 701. Through adjustment of the legs, the rear panel 201 and the rear edge of the base panel are lifted or lowered, and the base panel 100 is tilted/adjusted to level with use of the bubble level at 103.

Figure 14A:
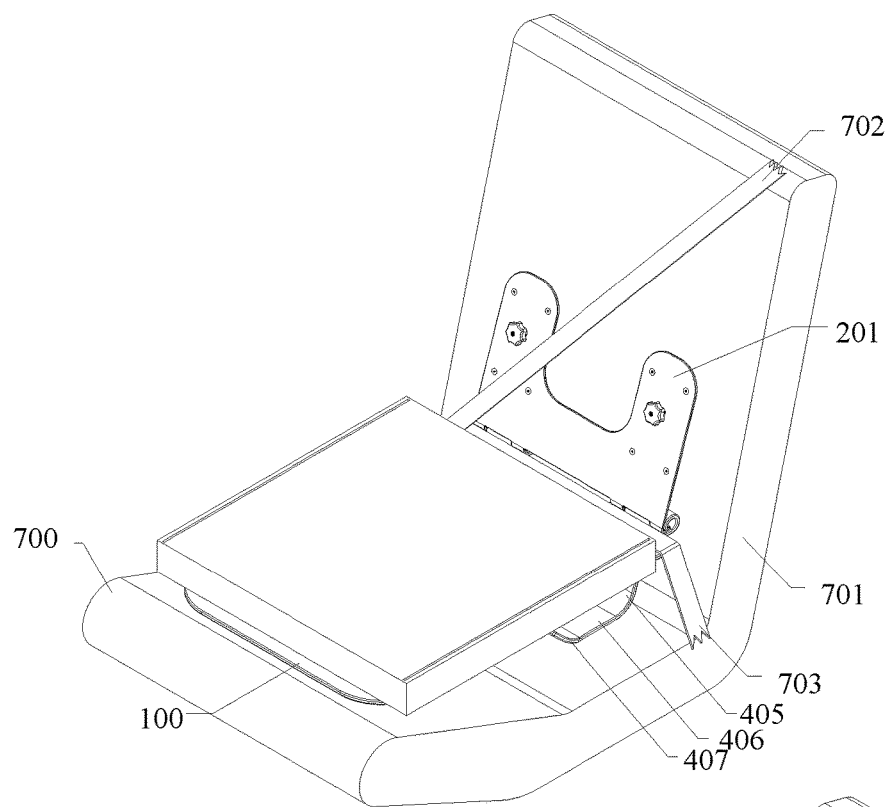
FIG. 14A shows the Delivery Butler assembly installed in a passenger seat with a lap and shoulder belt, with no fence assembly installed and a large item on its receiving surface.
Figure 14B:
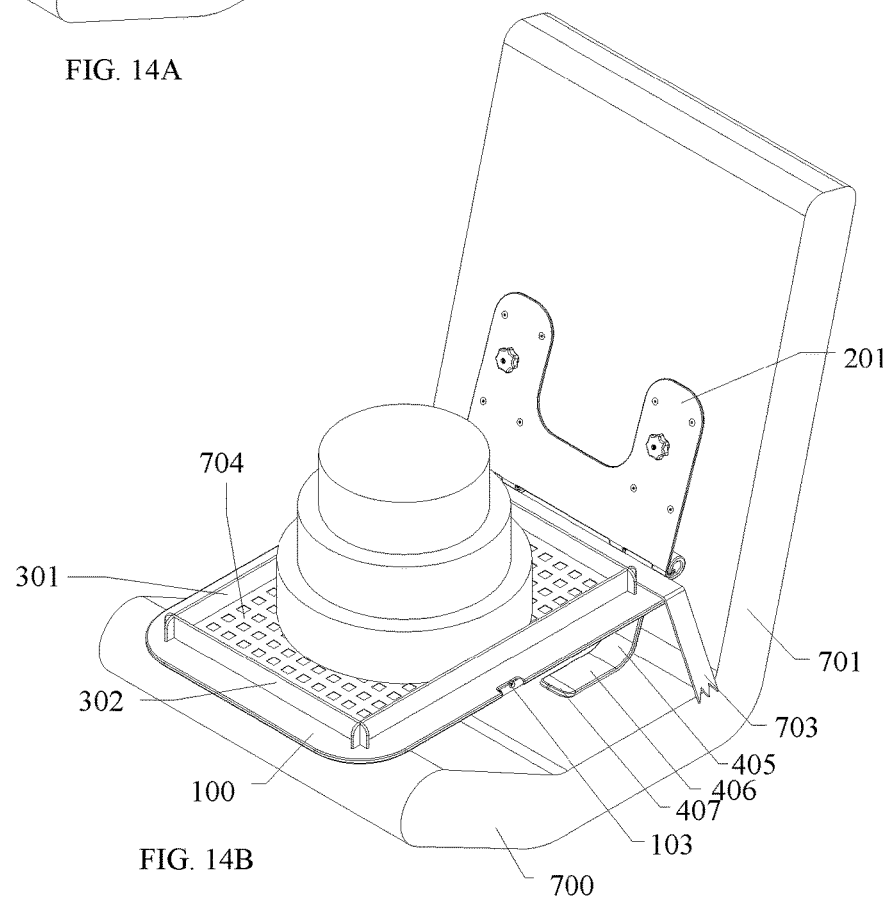
FIG. 14B shows the Delivery Butler assembly installed in an alternate passenger seat with a lap belt, with non-slip surface, a fence assembly, and an item on its receiving surface within the fence assembly.

After the Delivery Butler has been adjusted to level, it should be belted in using a lap belt 703 or lap and shoulder safety belt 702, 703 as shown in FIGS. 14A and 14B. Fence segments 301, 302 can be installed, and other inserts can be added, for example a cup holder or special support for a flower arrangement.

The Delivery Butler can be made of plastic, metal, wood, and other materials. The materials should be able to withstand the heat of food, the heat of a vehicle on a sunny day, and moisture. In a preferred embodiment, the Delivery Butler is primarily made of ABS plastic or polypropylene. A prototype made of thermoplastic (modified PLA) tended to warp if left in a vehicle in the hot sun. Plastic is preferred over metal, so that the Delivery Butler can be hosed down without rusting or corrosion. Fasteners can be made of stainless steel, to minimize rusting or corrosion.

In a preferred embodiment, all parts have rounded corners, to avoid damage to seats and seat backs. The surfaces of the Delivery Butler that contact the seat and seat back can have a smooth texture, a rough texture, or any texture in between. When properly installed with a seatbelt, the belt combined with the weight of the Delivery Butler and an item on the Delivery Butler adequately prevents the apparatus from sliding or moving.

The hinge mechanism connecting the base panel and rear panel can be implemented with structures that are not curls. Leg guides can be attached to the rear panel using an attachment method and structure different from the screw/bolt holes shown, such as glue, clips, or another attachment structure. The prongs of the legs can be longer than the leg guides, allowing the top ends of the prongs to protrude from the top of the leg guides. The prongs of the legs can be shorter than the leg guides, so that the top ends of the prongs do not protrude from the top of the leg guides.

In a preferred embodiment, the leg clamp plate is rectangular, and the shape of the bolt head and leg clamp plate indentation where the bolt head is seated is hexagonal. The shape of the leg clamp plate can be another shape which prevents spinning, and the shape of the bolt head and leg clamp plate indentation can be another shape which prevents spinning. The fence rails can be attached to the base panel using alternate methods, such as slots in different configurations from that shown; Velcro; snaps; glue; bolts or screws; or other methods and structures. An alternate tightening assembly structure or configuration can be used to hold and release the legs in various positions.

The rear panel 201 can be roughly rectangular, or it can have a cut-out portion like that shown at 205, to reduce weight and material of the apparatus. It can have one or more cut-out portions of shapes different from those shown. The base panel 100 can have removable fence portions installed as shown in the Figures. It can have permanently installed fence portions. It can have additional slots or other attachment points for fence portions and other accessories.

A delivery apparatus has been described above with particularity. Modifications and alterations will occur to those upon reading and understanding the preceding detailed description. The disclosure, however, is not limited to only the embodiments described above. Instead, the disclosure is broadly defined by the appended claims and the equivalents thereof.

Moreover, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the claims.

I claim:

1. An apparatus for securing items for transport in a passenger seat of a vehicle, said apparatus comprising:
    a base panel with a flat top surface, a front edge, and a rear edge;
    a rear panel with a bottom edge, a rear surface, and one or more leg guides, said leg guides having vertical channels;
    one or more legs, each leg comprising a top edge, an upper segment with front and back surfaces, a bend, and a foot segment with a bottom surface and a front edge, wherein each leg's upper segment is configured to removably and adjustably slide into and along the channel of a leg guide, and wherein each leg's foot segment extends below said base panel, and wherein each foot segment's bottom surface is configured to rest on a passenger seat of a vehicle; and
    one or more clamp mechanisms, each configured to releasably hold said leg in position within the channel of said leg guide;
    wherein the bottom edge of the rear panel is configured to attach with a hinge mechanism to the rear edge of the base panel;
    wherein each said leg guide is part of a tightening assembly that comprises a housing, a clamp plate, a hex bolt with a head and a shaft, and a knob;
    wherein the head of the hex bolt fits into a hex-shaped opening in the clamp plate, and the shaft of the hex bolt passes through the clamp plate, the vertical channel, a bolt hole in the rear panel, and the knob;
    wherein the knob is configured to tighten and loosen the tightening assembly; and
    wherein each leg's upper segment has a top portion with a slot, and wherein said slot extends from the leg's top edge downwards through its top portion, allowing said top portion to pass up through the vertical channel past the hex bolt shaft.

2. The apparatus of claim 1, further comprising a fence assembly which removably attaches to the base panel's top surface.

3. The apparatus of claim 1, wherein each leg further comprises an upwardly curved toe at the foot's front edge.

4. The apparatus of claim 1, wherein each leg's upper segment and foot segment form an angle of 108.5 degrees.

5. An apparatus for securing items for transport in a passenger seat of a vehicle, said apparatus comprising:

a base panel with a flat top surface, a front edge, and a rear edge;

a rear panel with a bottom edge, a rear surface, and one or more leg guides, said leg guides having vertical channels;

one or more legs, each leg comprising a top edge, an upper segment with front and back surfaces, a bend, and a foot segment with a bottom surface and a front edge, wherein each leg's upper segment is configured to removably and adjustably slide into and along the channel of a leg guide, and wherein each leg's foot segment extends below said base panel, and wherein each foot segment's bottom surface is configured to rest on a passenger seat of a vehicle; and one or more clamp mechanisms, each configured to releasably hold said leg in position within the channel of said leg guide;

wherein the bottom edge of the rear panel is configured to attach with a hinge mechanism to the rear edge of the base panel; and wherein the hinge mechanism comprises a plurality of curls extending upward from the base panel rear edge, and a plurality of curls extending rearward from the rear panel bottom edge.

6. The apparatus of claim 5, further comprising a fence assembly which removably attaches to the base panel's top surface.

7. The apparatus of claim 5, wherein each leg further comprises an upwardly curved toe at the foot's front edge.

8. The apparatus of claim 5, wherein each leg's upper segment and foot segment form an angle of 108.5 degrees.

\* \* \* \* \*